(12) United States Patent
Langhans et al.

(10) Patent No.: US 6,735,873 B2
(45) Date of Patent: May 18, 2004

(54) GUIDE TUBE ASSEMBLY FOR A PORTABLE HANDHELD WORK APPARATUS

(75) Inventors: Klaus Langhans, Winnenden (DE); Johann Trumpf, Winnenden (DE)

(73) Assignee: Andreas Stihl AG & Co., Waiblingen (DE)

( * ) Notice: Subject to any disclaimer, the term of this patent is extended or adjusted under 35 U.S.C. 154(b) by 344 days.

(21) Appl. No.: 09/953,224

(22) Filed: Sep. 17, 2001

(65) Prior Publication Data

US 2002/0032965 A1 Mar. 21, 2002

(30) Foreign Application Priority Data

Sep. 15, 2000 (DE) .......................................... 100 45 598

(51) Int. Cl.[7] .............................. B26B 19/02; F16C 1/06
(52) U.S. Cl. .............................. 30/216; 30/210; 30/276
(58) Field of Search ................................ 30/210, 296.1, 30/276, 216; 464/51, 52, 181

(56) References Cited

U.S. PATENT DOCUMENTS

| 2,814,924 | A | | 12/1957 | Group et al. | |
|---|---|---|---|---|---|
| 4,226,021 | A | | 10/1980 | Hoff | |
| 4,780,002 | A | | 10/1988 | Krause | |
| 4,953,294 | A | | 9/1990 | Dohse | |
| 5,261,162 | A | | 11/1993 | Siegler | |
| 5,771,583 | A | * | 6/1998 | Kremsler et al. | 30/216 |
| 5,839,961 | A | * | 11/1998 | Andress | 464/52 |
| 2001/0010124 | A1 | * | 8/2001 | Schneider | 30/502 |
| 2002/0004988 | A1 | * | 1/2002 | Stoll et al. | 30/276 |

FOREIGN PATENT DOCUMENTS

| DE | 1 179 412 | 10/1964 |
|---|---|---|
| FR | 2 644 031 | 9/1990 |
| GB | 1008015 | 10/1965 |

* cited by examiner

Primary Examiner—Hwei-Siu Payer
(74) Attorney, Agent, or Firm—Walter Ottesen

(57) ABSTRACT

The invention is directed to a guide tube assembly for a portable handheld work apparatus with a drive motor (3) mounted at one end (2) of the guide tube (1). The drive motor (3) is connected to a work tool (6) mounted at one end (5) of the guide tube (1) via a drive shaft (4) mounted in the guide tube (1). A reinforcing sleeve (8) is axially inserted into the work tool end (5) of the guide tube (1) in order to better introduce engine loads at a flange (7) of the work tool (6) into the guide tube (1). The reinforcing sleeve (8) projects axially along a part length (L') of the guide tube (1) from the flange (7) into the guide tube (1).

15 Claims, 2 Drawing Sheets

GUIDE TUBE ASSEMBLY FOR A PORTABLE HANDHELD WORK APPARATUS

FIELD OF THE INVENTION

The invention relates to a guide tube for a portable handheld work apparatus such as a brushcutter, hedge trimmer or the like. The work apparatus has a drive motor mounted on one end of the guide tube and a tool mounted at the other end thereof. The tool is fixedly attached to the guide tube via a flange of a gear case. The tool is driven by a drive shaft disposed in the guide tube.

BACKGROUND OF THE INVENTION

Guide tubes or protective tubes of the above kind are used with portable handheld work apparatus such as brushcutters, hedge trimmers or the like, wherein a drive motor is mounted at a spacing to a driven tool. The drive motor is attached to one end of the guide tube and guides a work tool mounted at the other end of the guide tube via a drive shaft running in the guide tube. The work tool is connected via a gear case and can be a filament cutter, a knife or also a hedge cutter blade. The gear case is provided with a flange configured as a receptacle bushing or the like wherein the end of the guide tube facing toward the flange is inserted over a partial length thereof and held. Stress peaks can occur in the guide tube at the transition of the attachment flange to the guide tube during operation of the work apparatus such as a brushcutter, overhead branch cutter, hedge trimmer or the like. These stress peaks have to be taken up with a corresponding configuration and dimensioning of the guide tube.

SUMMARY OF THE INVENTION

It is an object of the invention to provide a guide tube which is improved so that force is introduced into the guide tube in a simple manner.

The guide tube assembly of the invention is for a portable handheld work apparatus including a brushcutter, hedge trimmer or the like. The work apparatus has a drive motor and a work tool and the guide tube assembly includes: a guide tube having a first end on which the drive motor is mounted; the guide tube having a second end; a gear case connected to the work tool; the gear case having a flange mounted on the second end of the guide tube; a drive shaft rotatably journalled in the guide tube for operatively connecting the drive motor to the work tool to permit the work tool to be driven by the drive motor; a reinforcing sleeve inserted into the guide tube at the second end thereof; and, the reinforcing sleeve projecting axially along a part length (L') of the guide tube out from the end of the flange into the guide tube in the assembled state of the gear case.

In the guide tube of the invention, a reinforcing sleeve is inserted at least into the work tool end of the guide tube in the attachment segment. The reinforcing sleeve can be configured longer than the attachment segment and projects axially from the work tool flange along a part length of the guide tube. The reinforcing sleeve reinforces the guide tube especially in the transition region to the attachment segment. During operation, changing loads and vibrations occur especially in work tools such as a hedge trimmer blade, a knife or a running saw chain with these loads and vibrations being introduced into the guide tube. A step-like cross-sectional jump at the inner diameter of the guide tube is achieved in an axial direction toward the work tool by the reinforcing sleeve pushed axially into the guide tube. In the guide tube, stress peaks are avoided in the region of the force-introducing work tool flange.

Preferably, the reinforcing sleeve has a slot over its length which preferably conically expands at one end of the reinforcing sleeve. With this constructive measure, it is possible to insert a reinforcing sleeve into a longitudinally welded guide tube having an inner unmachined weld seam. The conical expansion of the slot with beveled edges effects a centering of the slot on the weld seam so that the insertion is facilitated. It is practical to configure the clear width of the slot wider than the weld seam. Preferably, the width of the slot is approximately one quarter of the diameter of the reinforcing sleeve in order to make possible a rapid mounting without jamming of the reinforcing sleeve in the guide tube.

At one axial end of the reinforcing sleeve, a radial stop projects outwardly and is provided as an axial stop of the reinforcing sleeve against the guide tube. The stop can be provided as a bent-over collar or lug. The collar or several lugs are arranged on the axial end opposite the conical widening of the slot.

It is practical to configure the reinforcing sleeve as a steel sleeve or to manufacture the reinforcing sleeve from longitudinally welded sheet metal.

The diameter of the reinforcing sleeve is selected approximately equal to or preferably slightly greater than the inner diameter of the guide tube. With these constructive measures, the reinforcing sleeve lies in the guide tube under radial tension. The reinforcing sleeve is elastically bendable especially because of the longitudinal slot therein and an elastic connection of guide tube and reinforcing sleeve is achieved in the flange region of the work tool. Peak stresses in the flange region of a work tool head are reliably conducted into the guide tube in this way.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
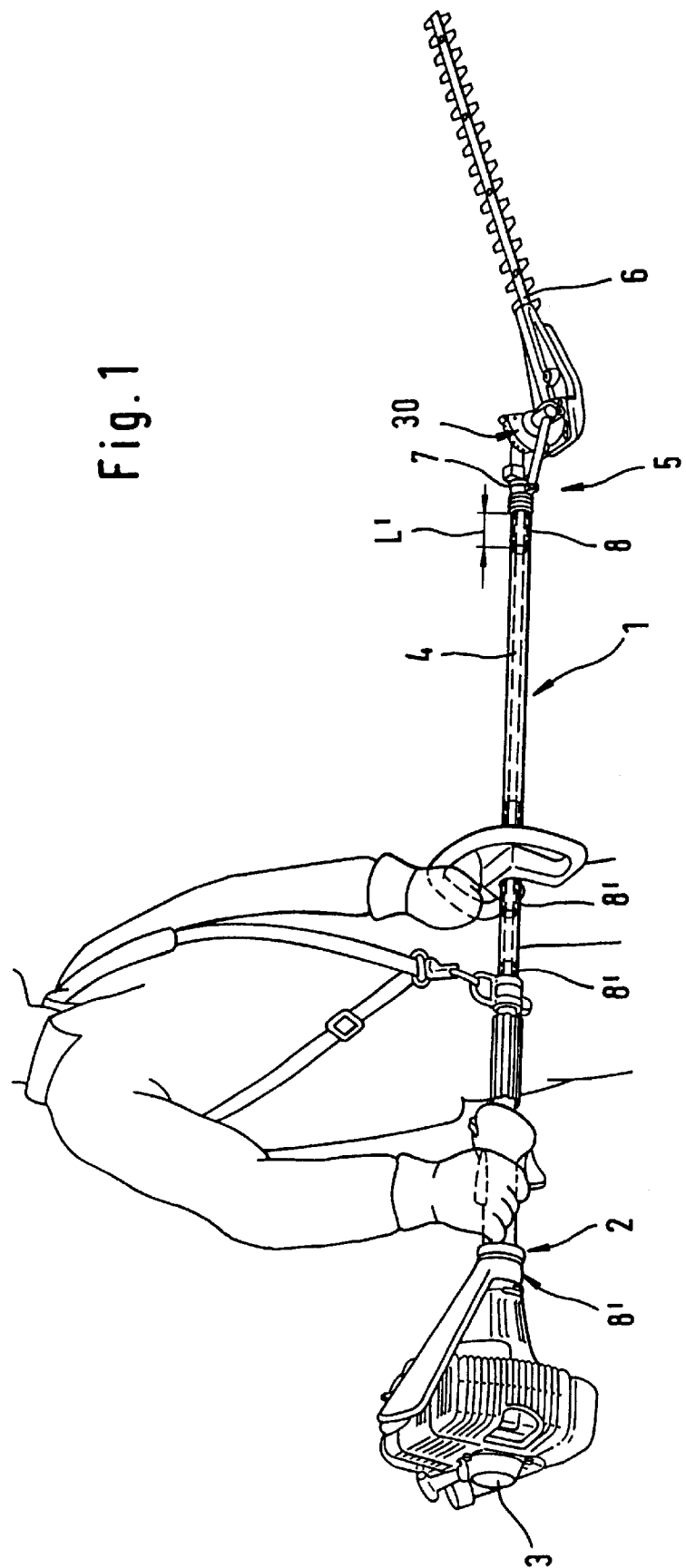
FIG. 1 is a view of a guide tube of the invention on a portable handheld work apparatus.

FIG. 1 shows a perspective view of a guide tube 1 on a portable handheld work apparatus which is configured as a hedge trimmer. A drive motor 3 is fixedly attached to an axial end 2 of the guide tube 1. The drive motor 3 drives a work tool 6 via a drive shaft 4 rotatably journalled in the guide tube 1. In the embodiment, the work tool 6 is configured as a hedge trimmer blade and is connected at the other end 5 of the guide tube 1 via a gear case 30. The gear case 30 is fixedly attached to the guide tube 1 via a flange 7. The other end 5 of the guide tube 1 is the work tool end thereof and lies axially opposite the end 2 to which the drive motor 3 is attached. The guide tube 1 can also have a bent configuration.

A reinforcing sleeve 8 is inserted into the interior of the guide tube 1 at the work tool end 5 thereof. The reinforcing sleeve 8 extends at least in the region of the axial end of the flange 7 and projects preferably axially over a partial length L' of the guide tube 1 beyond the axial end of the flange 7 of the gear case 30 into the guide tube 1. The reinforcing sleeve 8 is held in the guide tube 1 preferably with radial tension, for example, with a press fit.

The reinforcing sleeve extends within the attachment section of the flange 7 on the guide tube 1 especially in the region of the free axial end of the attachment flange 7. It is practical to configure the reinforcing sleeve longer than the attachment flange 7.

Figure 2:
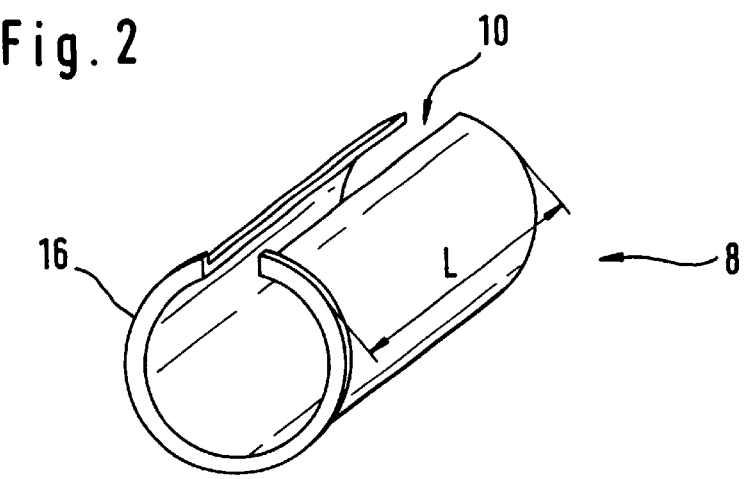
FIG. 2 is a perspective view of a reinforcing sleeve.

FIG. 2 shows the reinforcing sleeve in a perspective view. A longitudinal slot 10 extends through the reinforcing sleeve 8 along its entire length L. The slot 10 ends at an axial end 11 of the reinforcing sleeve 8 with beveled portions (12, 12') which conically widen the slot 10. This can be seen in FIG. 5 which shows a plan view of a portion of the reinforcing sleeve 8. The slot 10 has a clear width 13 which corresponds approximately to a quarter of the diameter D of the reinforcing sleeve 8 for the embodiment shown (see FIGS. 3 and 4). It is possible to insert the reinforcing sleeve 8 also into a guide tube which has a weld seam which projects radially inwardly. This is so because the slot 10 is configured in the manner described above which permits the slot 10 to be guided along the weld seam.

Figure 3:
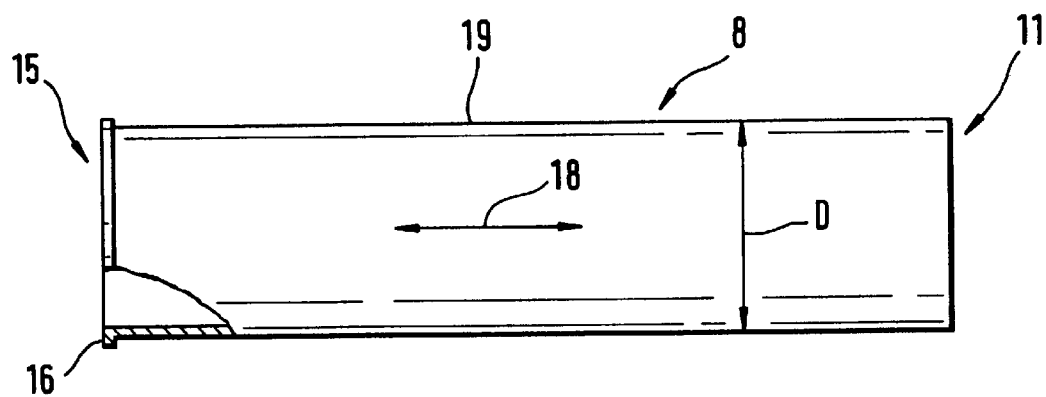
FIG. 3 is a side elevation view of the reinforcing sleeve of FIG. 2.
Figure 4:
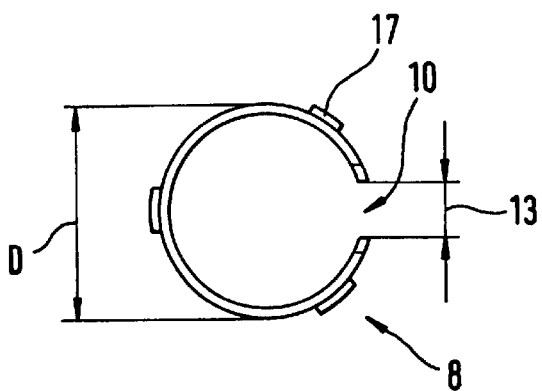
FIG. 4 is an end view of the reinforcing sleeve.
Figure 5:
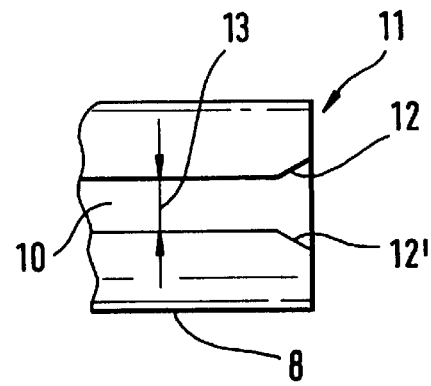
FIG. 5 is a plan view of a portion of the reinforcing sleeve.

End 15 of the reinforcing sleeve 8 lies axially opposite to the beveled portions (12, 12'). A stop is provided at the end 15 which delimits the insertion depth of the reinforcing sleeve 8. For this purpose, the edge of the reinforcing sleeve 8 can be bent over to form a collar 16 or to form one or several lugs 17 as shown in FIGS. 2 to 4. The axial stop is configured as a collar 16 or as lugs 17 and lies against the axial end face of the guide tube 1 between the guide tube end 5 and the base of the flange 7 in the assembled condition of the gear case 30. Preferably, the reinforcing sleeve 8 is a thin-walled steel sleeve 19 rolled in the longitudinal direction 18. The reinforcing sleeve 8 is especially made from a longitudinally rolled sheet metal. The outer diameter D of the reinforcing sleeve 8 is approximately equal to or preferably somewhat greater than the inner diameter of the guide tube 1. In this way, it is ensured that the reinforcing sleeve 8 lies under tension in the interior of the guide tube 1 and forms an elastic reinforcement of the guide tube 1 in the flange region of the guide tube 1.

It can be practical to arrange reinforcing sleeves 8' at further locations of the guide tube 1 in the interior thereof as shown in FIG. 1.

It is understood that the foregoing description is that of the preferred embodiments of the invention and that various changes and modifications may be made thereto without departing from the spirit and scope of the invention as defined in the appended claims.

What is claimed is:

1. A guide tube assembly for a portable handheld work apparatus, the work apparatus having a drive motor and a work tool, said guide tube assembly comprising:

a guide tube having a first end on which said drive motor is mounted;

said guide tube having a second end;

a gear case connected to said work tool;

said gear case having a flange mounted on said second end of said guide tube;

a drive shaft rotatably journalled in said guide tube for operatively connecting said drive motor to said work tool to permit said work tool to be driven by said drive motor;

a reinforcing sleeve inserted into said guide tube at said second end thereof; and, said reinforcing sleeve projecting axially along a part length (L') of said guide tube out from the end of said flange into said guide tube in the assembled state of said gear case.

2. The guide tube assembly of claim 1, wherein said reinforcing sleeve has an axial length (L) greater than said flange.

3. The guide tube assembly of claim 2, wherein said reinforcing sleeve has a slot over said axial length (L) thereof.

4. The guide tube assembly of claim 3, wherein said slot is widened at one axial end of said reinforcing sleeve.

5. The guide tube assembly of claim 4, wherein said slot is conically widened by beveled portions at said one axial end of said reinforcing sleeve.

6. The guide tube assembly of claim 4, wherein said slot has a clear width corresponding to approximately a quarter of the diameter (D) of said reinforcing sleeve.

7. The guide tube assembly of claim 1, wherein said reinforcing sleeve has a radially outwardly extending stop at one end thereof.

8. The guide tube assembly of claim 7, wherein said stop is configured as a radially outwardly extending bentover collar.

9. The guide tube assembly of claim 1, wherein said reinforcing sleeve has an axial length (L) and a slot extending over said axial length (L); said slot is conically widened by beveled portions at one axial end of said reinforcing sleeve; and, said reinforcing sleeve has a radially outwardly extending stop formed at the other axial end thereof.

10. The guide tube assembly of claim 7, wherein said stop is formed as a lug bent radially outwardly.

11. The guide tube assembly of claim 1, wherein said reinforcing sleeve is a steel sleeve.

12. The guide tube assembly of claim 11, wherein said steel sleeve defines a longitudinal axis and is rolled in the direction of said longitudinal axis.

13. The guide tube assembly of claim 1, wherein said guide tube has an inner diameter and said reinforcing sleeve has an outer diameter (D) approximately equal to said inner diameter of said guide tube.

14. The guide tube assembly of claim 1, wherein said guide tube has an inner diameter and said reinforcing sleeve has an outer diameter (D) somewhat greater than said inner diameter of said guide tube.

15. The guide tube assembly of claim 1 wherein said work apparatus is a brushcutter or a hedge trimmer.

* * * * *